United States Patent
Leary

(10) Patent No.: US 8,490,211 B1
(45) Date of Patent: Jul. 16, 2013

(54) METHODS FOR REFERENCING RELATED MAGNETIC HEAD MICROSCOPY SCANS TO REDUCE PROCESSING REQUIREMENTS FOR HIGH RESOLUTION IMAGING

(75) Inventor: Sean P. Leary, Saraburi (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/537,010

(22) Filed: Jun. 28, 2012

(51) Int. Cl.
*G01Q 60/56* (2010.01)

(52) U.S. Cl.
CPC ...................................... *G01Q 60/56* (2013.01)
USPC .............................................. 850/49; 850/46

(58) Field of Classification Search
USPC .............................................. 850/49, 46, 33
See application file for complete search history.

(56) References Cited

U.S. PATENT DOCUMENTS

| | | | |
|---|---|---|---|
| 5,753,814 A * | 5/1998 | Han et al. ..................... | 73/105 |
| 6,521,902 B1 | 2/2003 | Chang et al. | |
| 7,081,369 B2 | 7/2006 | Scott et al. | |
| 7,186,574 B2 | 3/2007 | Dulay et al. | |
| 7,208,965 B2 | 4/2007 | Zhang et al. | |
| 7,308,334 B2 | 12/2007 | Tasker et al. | |
| 7,372,016 B1 | 5/2008 | Tortonese et al. | |
| 7,406,860 B2 | 8/2008 | Zhou et al. | |
| 7,664,566 B2 | 2/2010 | Tasker et al. | |
| 7,703,314 B2 | 4/2010 | Abe et al. | |
| 8,094,925 B2 | 1/2012 | Schneidewind et al. | |
| 8,095,231 B2 | 1/2012 | Tasker et al. | |
| 8,097,846 B1 | 1/2012 | Anguelouch et al. | |
| 8,214,918 B2 * | 7/2012 | Amos et al. ..................... | 850/49 |
| 2003/0093894 A1 | 5/2003 | Dugas et al. | |
| 2006/0073618 A1 | 4/2006 | Dulay et al. | |
| 2006/0286772 A1 | 12/2006 | Pearl | |
| 2007/0251306 A1 | 11/2007 | Zhou et al. | |
| 2011/0091095 A1 | 4/2011 | Yin | |
| 2011/0138505 A1 | 6/2011 | Zhou et al. | |

FOREIGN PATENT DOCUMENTS

| | | |
|---|---|---|
| JP | 11-258129 A | 9/1999 |
| JP | 2005-265424 A | 9/2005 |
| WO | WO2005050691 A3 | 11/2003 |
| WO | WO2008111365 A1 | 9/2008 |

OTHER PUBLICATIONS

Lapshin, R., "Automatic drift elimination in probe microscope images based on techniques of counter-scanning and topography feature recognition", Measurement Science and Technology, 2007, pp. 907-927, vol. 18, Institute of Physics Publishing.

Park Systems Brochure—Programmable Data Density (PDD) for High Throughput Feature Measurement; accessed from www.parkafm.com on: Jan. 26, 2012; 2 pages.

* cited by examiner

*Primary Examiner* — Kiet T Nguyen

(57) ABSTRACT

Methods for referencing related magnetic head microscopy scans to reduce processing requirements for high resolution imaging are provided. One such method includes performing a low resolution pole tip recession scan of a pole tip area of a magnetic head, performing a high resolution writer pole recession scan of a writer pole area of the magnetic head, preparing a portion of the low resolution scan for alignment, performing a rough leveling of the high resolution scan, aligning the portion of the low resolution scan and the high resolution scan using pattern recognition and a database of features, subtracting the high resolution scan from the aligned portion of the low resolution scan, and leveling the high resolution scan based on a result of the subtraction.

19 Claims, 5 Drawing Sheets

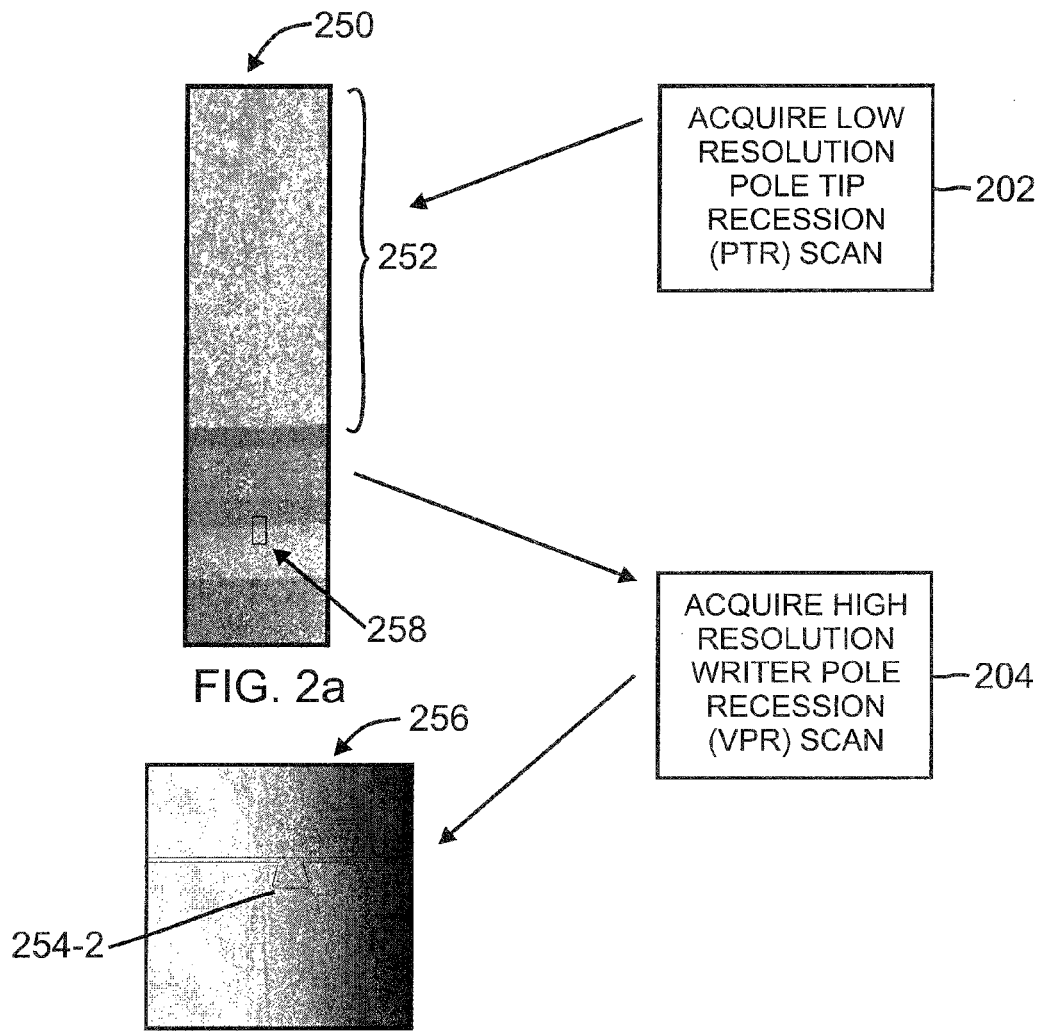
FIG. 2a
FIG. 2b-1
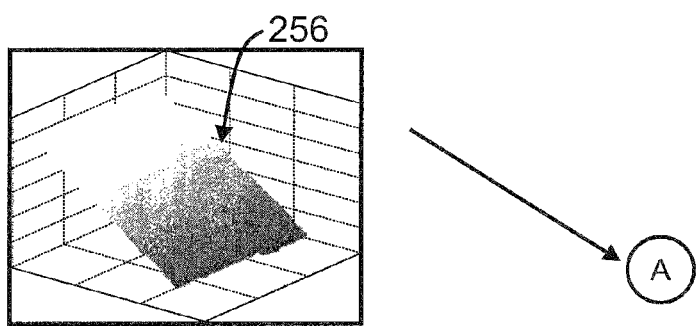
FIG. 2b-2

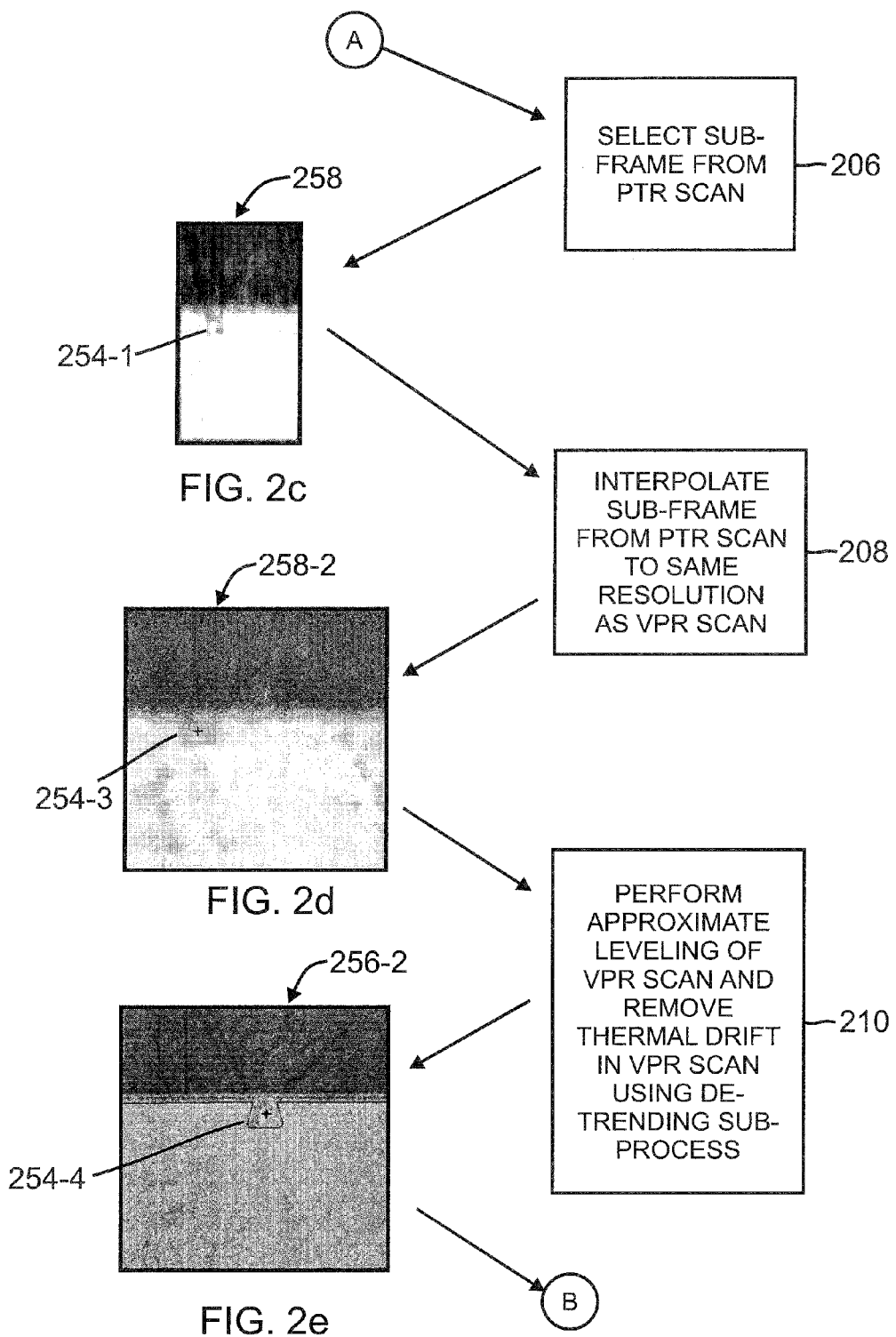

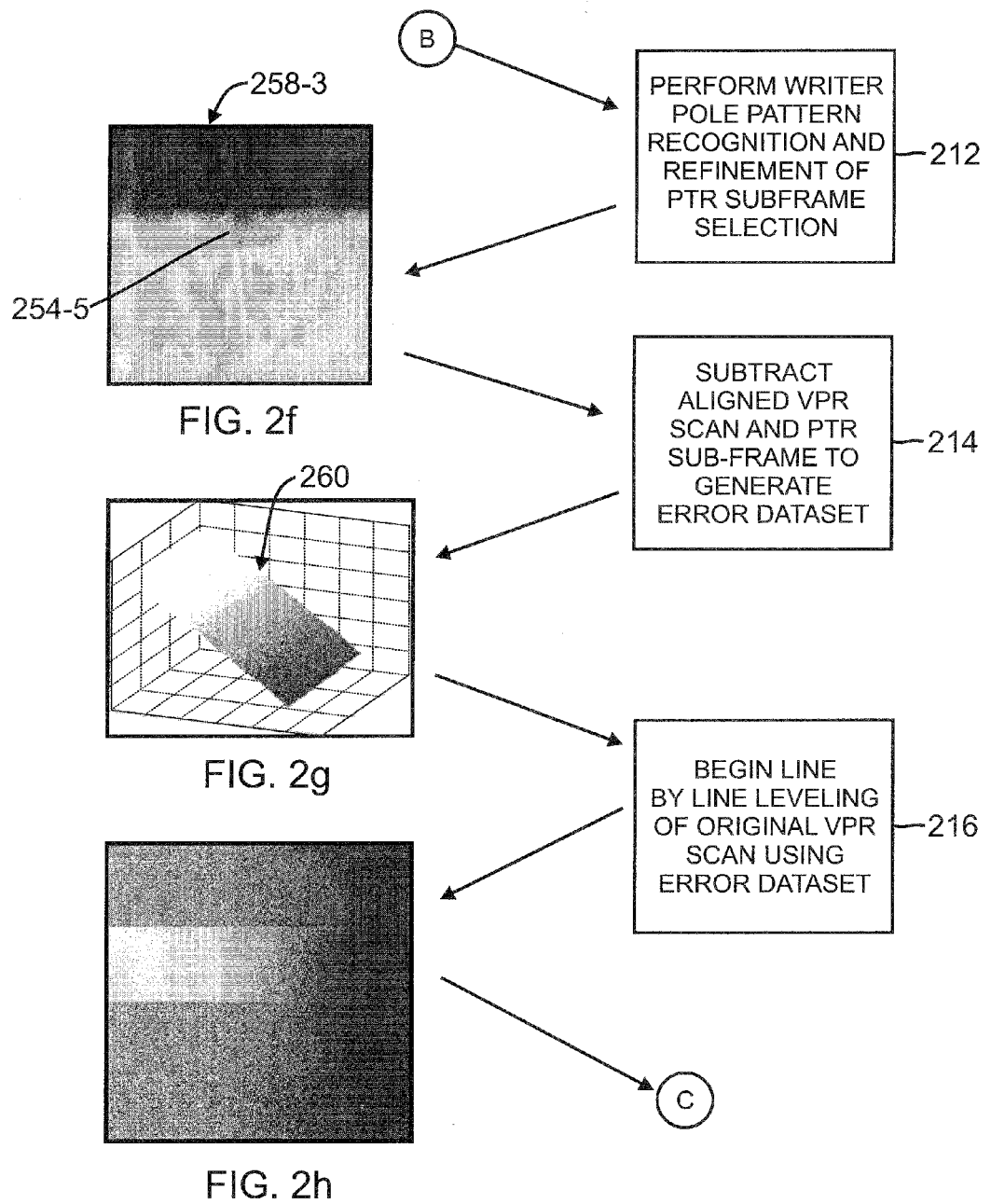

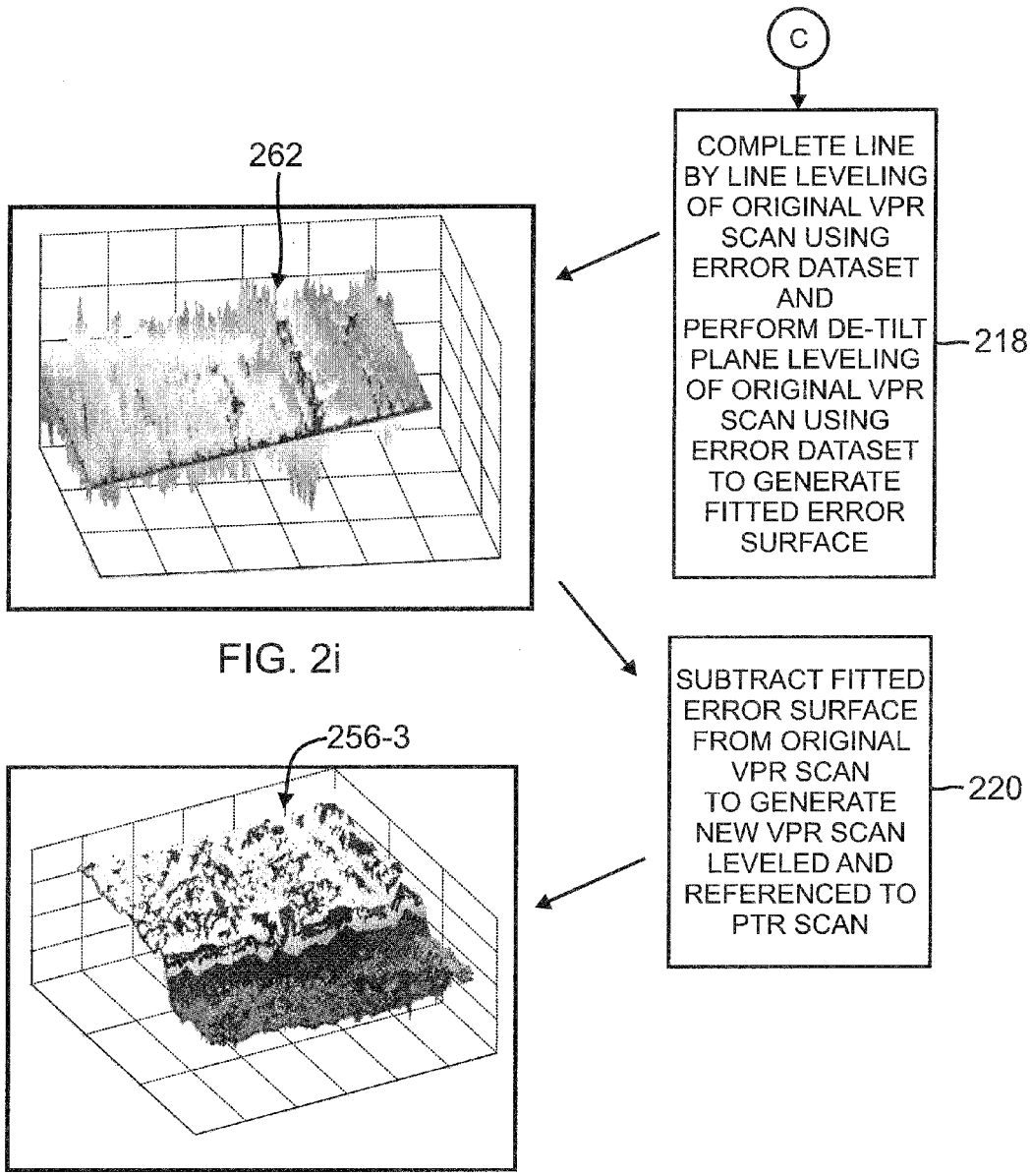

METHODS FOR REFERENCING RELATED MAGNETIC HEAD MICROSCOPY SCANS TO REDUCE PROCESSING REQUIREMENTS FOR HIGH RESOLUTION IMAGING

FIELD

The present invention relates generally to processes for manufacturing magnetic heads for disk drives, and more specifically, methods for referencing related magnetic head microscopy scans to reduce processing requirements for high resolution imaging.

BACKGROUND

In the manufacture of magnetic heads for storage devices, atomic force microscopy (AFM) is commonly used for pole-tip recession (PTR) measurements due to its ability to resolve sub-nanometer changes in topography. However, magnetic head scan sizes must generally be relatively large to encompass the reader and writer shields as well as the air bearing surface (ABS). The ABS is assumed to be flat on average and is used to identify and remove undesirable artificial trends (e.g., artifacts) in the lateral (e.g., x and y) and vertical (e.g., z) directions of AFM scans in a process referred to as leveling. The ABS is also chosen as the reference position against which important characteristics such as the step heights in the shield/pole region are measured. Due to its importance, approximately fifty percent of the scan is often dedicated to the ABS alone. However, features such as the writer pole and reader can be two to three orders of magnitude smaller than the PTR scan size. The scan resolution necessary to adequately measure these areas along with PTR areas therefore involves a prohibitively low throughput. Smaller separate high-resolution scans can be run on these features, but the ABS generally cannot be included, thus making leveling/referencing challenging.

To address these sorts of referencing challenges, Park Systems offers a commercial method to integrate high and low resolution AFM scans by way of a programmable data density (PDD) option that is implemented during the measurement with its metrology tools. However, this method results in higher costs for the metrology tools and in additional artifacts to both PTR and writer pole recession (VPR) scans which are highly undesirable. As such, a method for referencing related magnetic head scans to address these deficiencies by reducing processing requirements for high resolution imaging is needed.

SUMMARY

Aspects of the invention relate to methods for referencing related magnetic head microscopy scans to reduce processing requirements for high resolution imaging. In one embodiment, the invention relates to a method for referencing related magnetic head atomic force microscopy scans, the method including performing a low resolution pole tip recession scan of a pole tip area of a magnetic head, performing a high resolution writer pole recession scan of a writer pole area of the magnetic head, preparing a portion of the low resolution scan for alignment, performing a rough leveling of the high resolution scan, aligning the portion of the low resolution scan and the high resolution scan using pattern recognition and a database of features, subtracting the high resolution scan from the aligned portion of the low resolution scan, and leveling the high resolution scan based on a result of the subtraction.

BRIEF DESCRIPTION OF THE DRAWINGS

FIGS. 2a to 2j illustrate a sequence of views of related magnetic head microscopy scans, associated datasets, and corresponding processing actions performed on the related microscopy scans in a process for referencing the related magnetic head microscopy scans to reduce processing requirements for high resolution imaging in accordance with one embodiment of the invention.

DETAILED DESCRIPTION

Figure 1:
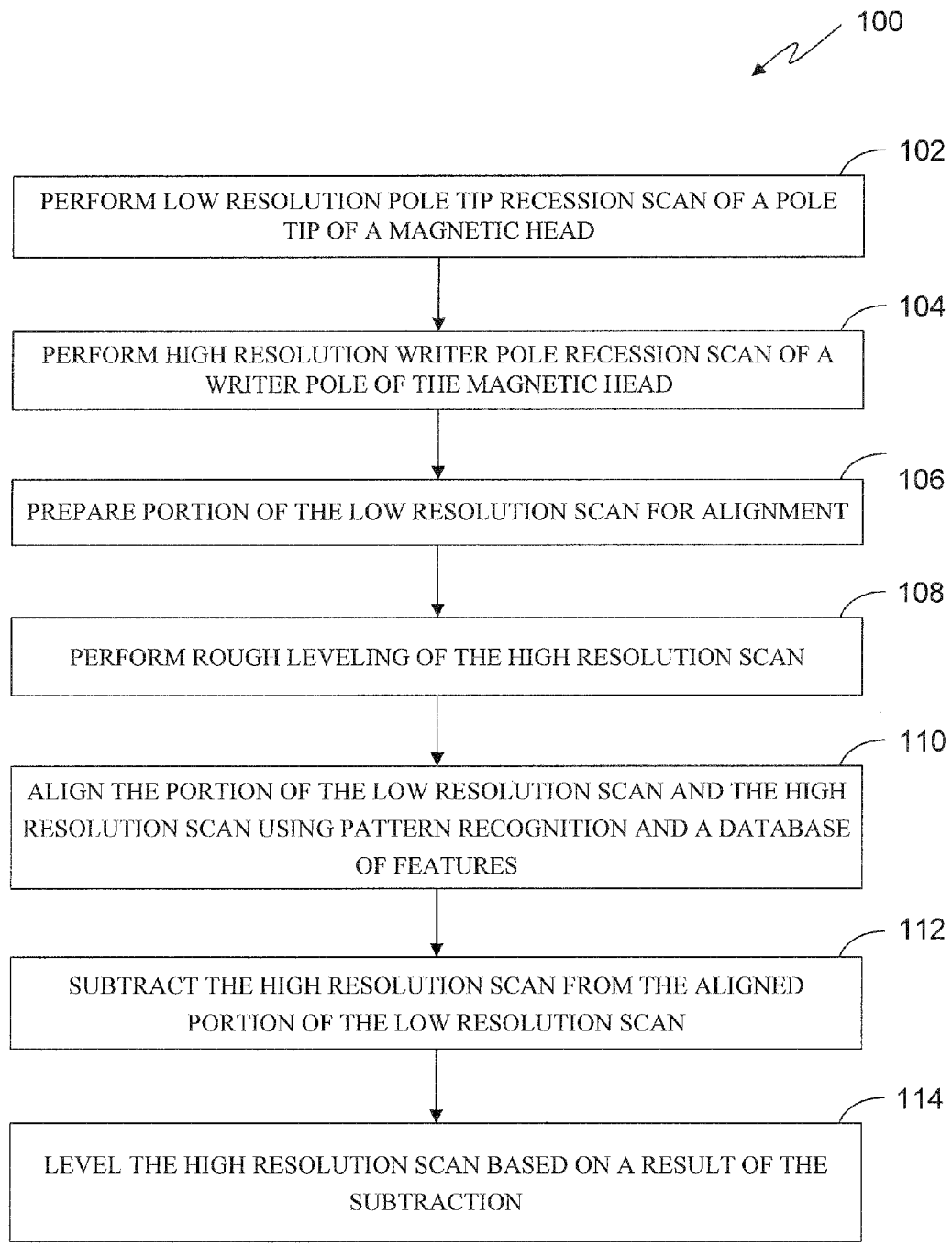
FIG. 1 is a flowchart of a process for referencing related magnetic head microscopy scans to reduce processing requirements for high resolution imaging in accordance with one embodiment of the invention.

Referring now to the drawings, embodiments of processes for referencing related magnetic head microscopy scans to reduce processing requirements for high resolution imaging are illustrated. The referencing or integration processes acquire and level a low resolution pole tip recession (PTR) scan, acquire a high resolution writer pole recession (VPR) scan, interpolate the PTR scan, and align the PTR and VPR scans using pattern recognition to reference the VPR scan to the PTR scan. In such case, the processes generate a high resolution scan of the writer pole (e.g., VPR scan) that is properly referenced to a key feature in the low resolution scan (e.g., PTR scan) such as the air bearing surface (ABS). These referencing/integration processes can thereby avoid multiple high resolution scans and/or high resolution scans of relatively large areas that are both costly and time consuming. Instead, the referencing/integration processes can perform the low resolution PTR scan of a relatively large area including the pole tip, perform the high resolution VPR scan on only a relatively small area including the writer pole, and then reference the VPR scan to the PTR scan.

FIG. 1 is a flowchart of a process 100 for referencing related magnetic head microscopy scans to reduce processing requirements for high resolution imaging in accordance with one embodiment of the invention. The process first performs (102) a low resolution pole tip recession (PTR) scan of a pole tip of a magnetic head. In several embodiments, the low resolution pole tip recession scan is performed over a relatively large area that includes both an air bearing surface and a writer pole associated with the magnetic head for a storage device. In a number of embodiments, the process also levels the PTR scan using techniques known in the art while making the assumption that the ABS on the scale of the scan is substantially flat. In one embodiment, the process performs the low resolution PTR scan with a substantially constant speed (e.g., about constant speed).

The process then performs (104) a high resolution writer pole recession (VPR) scan of a writer pole of the magnetic head. In a number of embodiments, the process performs the VPR scan over an area that is relatively small (e.g., a subset of the PTR scan) and includes the writer pole associated with the magnetic head. The process prepares (106) a portion of the low resolution PTR scan for alignment. In one embodiment, the process prepares the portion of the low resolution PTR scan for alignment by selecting a first sub-frame of the low resolution scan, and then generating a second sub-frame using interpolation of the first sub-frame, where the second sub-frame is made to have substantially the same resolution as the high resolution scan. In one embodiment, the process performs the high resolution VPR scan with a substantially constant speed (e.g., about constant speed).

The process then performs (108) a rough leveling of the high resolution PTR scan. The process aligns (110) the portion of the low resolution scan and the high resolution scan using pattern recognition and a database of features. The process then subtracts (112) the aligned portion of the high resolution scan from the aligned low resolution scan. The process then levels (114) the high resolution scan based on a result of the subtraction.

In one embodiment, the process can perform the sequence of actions in a different order. In another embodiment, the process can skip one or more of the actions. In other embodiments, one or more of the actions are performed simultaneously. In some embodiments, additional actions can be performed.

FIGS. 2a to 2j illustrate a sequence of views of related magnetic head microscopy scans, associated datasets, and corresponding processing actions performed on the related microscopy scans in a process for referencing the related magnetic head microscopy scans to reduce processing requirements for high resolution imaging in accordance with one embodiment of the invention. In FIG. 2a, the process first acquires (202) a low resolution pole tip recession (PTR) scan 250 of a pole tip of a magnetic head of a storage device. In a number of embodiments, the microscopy scans are atomic force microscopy (AFM) scans. In several embodiments, the low resolution pole tip recession PTR scan 250 is performed over a relatively large area of the magnetic head that includes both an air bearing surface 252 and the writer pole 254-1 (not visible in FIG. 2a but see FIG. 2c). In one embodiment, the size of the PTR scan 250 is about 20 microns by about 40 microns and the scan resolution is about 40 to 80 nanometers (nm) per pixel. In a number of embodiments, the process also levels the PTR scan 250 using techniques known in the art while making the assumption that the ABS on the scale of the scan is substantially flat.

In FIG. 2b-1 and FIG. 2b-2, the process then performs (204) a high resolution writer pole recession (VPR) scan 256 of the writer pole of the magnetic head. FIG. 2b-1 illustrates a two dimensional view of the VPR scan 256. FIG. 2b-2 illustrates the VPR scan 256 in three dimensions and particularly the large thermal artifact and offset in the vertical direction. In several embodiments, this distortion needs to be removed before attempting pattern recognition. In a number of embodiments, the VPR scan 256 is performed over an area that is relatively small (e.g., a subset of the PTR scan) and includes the writer pole 254-2. In one embodiment, the size of the VPR scan 256 is about 2 microns by about 2 microns and the scan resolution is about 4 nm per pixel. In FIG. 2c, the process selects (206) a sub-frame 258 from the PTR scan 250 that includes the writer pole. In FIG. 2d, the process (208) interpolates the sub-frame 258 (e.g., first sub-frame) from the PTR scan 250 to have substantially the same resolution as the VPR scan 256. The interpolated sub-frame 258-2 or second sub-frame 258-2 includes the writer pole 254-3. In one embodiment, the process uses two dimensional interpolation to achieve substantially the same resolution. In one embodiment, the second sub-frame 258-2 is interpolated to have a size of about 2 microns by about 2 microns.

In FIG. 2e, the process performs (210) an approximate leveling of the VPR scan 256 and removes any x-direction or y-direction type thermal drift in the VPR scan 256 using a de-trending sub-process. AFM scans such as the VPR scan 256 will generally contain a large amount of thermal drift in the z-direction (e.g., vertical direction) relative to the actual topography of the surface. In a number of embodiments, a rough or approximate leveling is accomplished using a first order line by line filter. This can be accomplished by least squares fitting each line (e.g., along the fast scan direction) in both the interpolated PTR sub-frame 258-2 and VPR scan 256 with a first order polynomial. At this stage, the PTR scan 250 and therefore the PTR sub-frame 258-2 has already been leveled using the ABS 252. In several embodiments, a difference between the first order fits of the PTR sub-frame 258-2 and the VPR scan 256 is calculated and subtracted from the VPR scan 256, thereby substantially removing any z-direction thermal drift.

As for the thermal drift removal in the VPR scan 256 using a de-trending sub-process, the sub-process first receives an original image (e.g., VPR scan 256) for correction, where the original image has been generated using microscopy. The sub-process then receives information indicative of a feature selected from within the original image by a user, where the selected feature includes an edge. In several embodiments, the sub-process provides a graphical user interface (GUI) depicting the original image and allowing the user to select a portion of the original image, where the portion or selected feature should include a portion of an edge contained in the original image.

The sub-process stores the original image in a database including a plurality of images, each having one or more features. In one embodiment, this action is optional and a separate sub-process may be responsible for populating the database. The sub-process then correlates the selected feature with one of the features stored in the database to identify a first plurality of points defining the edge. The sub-process removes one or more points of the first plurality of points using an outlier rejection technique. In one embodiment, this action is optional as the outliers are not substantial or a separate sub-process is responsible removing outliers. The sub-process then generates a smoothing spline approximation for a second plurality of points defining the edge. The sub-process generates a corrected image by shifting points of the original image in accordance with the smoothing spline approximation.

In several embodiments, the sub-process is implemented using a program written in MATLAB or on another suitable platform for performing relatively complex mathematic computations involving vectors and matrices. In a number of embodiments, the program can run on a general purpose computer employing an operating system known in the art or one yet to be developed. Additional details of the de-trending sub-process used to remove thermal drift in block 212 are described in a co-pending application entitled, "METHODS FOR CORRECTING FOR THERMAL DRIFT IN MICROSCOPY IMAGES", and having Ser. No. 13/537,007. The de-trended VPR scan 256-2 including the write pole 254-4 that results from the sub-process is illustrated in FIG. 2f.

In FIG. 2f, the process performs (212) writer pole pattern recognition and refinement of the PTR sub-frame selection. The process first uses an established database to locate the position of the writer pole in the VPR scan 256-2 (see FIG. 2e) using normalized cross-correlation (template matching) pattern recognition. In several embodiments, a pattern recognition training utility GUI with an associated database can be used to facilitate this step.

After the pattern recognition locates the write pole in the VPR scan 256-2 (see e.g., "+" symbol in FIG. 2e at write pole 254-4), a newly refined template centered about the pole is automatically created and this template is used for pattern recognition of the pole in the PTR sub-frame (see e.g., "+" symbol in FIG. 2d at write pole 254-3). Any offset between the x-y location of the pole in the VPR scan and PTR sub-frame is automatically compensated for by reselecting the sub-frame location in the PTR scan 250. As a result, the reselected PTR sub-frame 258-3 (e.g., third PTR sub-frame) shown in FIG. 2f has write pole 254-5 substantially centered or aligned in the same manner as the VPR scan 256-2 (see FIG. 2f) with the thermal drift removed. Adjustments in both the x direction (e.g., horizontal direction along page) and the y direction (e.g., vertical direction along page) have been made to align the write pole 254-5 with the write pole 254-4 of the VPR scan 256-2 with thermal drift removed.

In FIG. 2g, the process subtracts (214) the aligned VPR scan 256-2 and aligned PTR sub-frame 258-3 to generate an error dataset 260. In several embodiments, the process uses the original VPR scan 256 with no leveling except the x-y thermal drift correction of block 212 and generates the error dataset or error surface 260. In several embodiments, the error surface 260 represents a point by point, or pixel by pixel, subtraction.

In FIG. 2h, the process begins (216) line by line leveling of the original VPR scan 256 using the error dataset 260. In several embodiments, the performing the line by line leveling includes performing a zero order line by line leveling (e.g., line average removal) on the error dataset 260 and subtracting values of the leveled error dataset from lines of the high resolution scan. In some embodiments, the process attempts to use only points not in the vicinity of the shield edge or write pole area by using results from previous pattern recognition steps to avoid these regions. This is because it can be undesirable for these areas to influence the result. Instead, the process takes points from the background areas.

In FIG. 2i, the process completes (218) the line by line leveling of the original VPR scan 256 using the error dataset 260 and performs a de-tilt plane leveling of the original VPR scan 256 using the error dataset 260 to generate a fitted error surface 262. In several embodiments, the de-tilt plane leveling includes performing a first order two dimensional plane fitting on the fitted error dataset 262 and/or a two dimensional smoothing spline approximation on the fitted error dataset 262.

In FIG. 2j, the process then subtracts (220) the fitted error surface 262 from the original VPR scan 256 to generate a new VPR scan 256-3 which is now leveled and referenced to the PTR scan 250. In such case, the high resolution VPR scan of the writer pole has been obtained and is properly referenced to the ABS in the low resolution PTR scan. As such, these referencing/integration processes thereby avoid the costly and time consuming multiple high resolution scans and/or high resolution scans of relatively large areas that are common in conventional processes. Instead, the referencing/integration processes can perform the low resolution PTR scan of a relatively large area including the pole tip, perform the high resolution VPR scan on only a relatively small area including the writer pole, and then reference the VPR scan to the PTR scan.

In one embodiment, the process of FIGS. 2a to 2j can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for referencing related magnetic head atomic force microscopy scans, the method comprising:
   performing a low resolution pole tip recession scan of a pole tip area of a magnetic head;
   performing a high resolution writer pole recession scan of a writer pole area of the magnetic head;
   preparing a portion of the low resolution scan for alignment;
   performing a rough leveling of the high resolution scan;
   aligning the portion of the low resolution scan and the high resolution scan using pattern recognition and a database of features;
   subtracting the high resolution scan from the aligned portion of the low resolution scan; and
   leveling the high resolution scan based on a result of the subtraction.

2. The method of claim 1:
   wherein the performing the low resolution pole tip recession scan comprises:
      leveling and referencing the low resolution pole tip recession scan to an air bearing surface of a pole tip within the low resolution pole tip recession scan;
   wherein the preparing the portion of the low resolution scan for alignment comprises:
      selecting a first sub-frame of the low resolution scan; and
      generating a second sub-frame using interpolation of the first sub-frame, the second sub-frame comprising substantially the same resolution as the high resolution scan; and
   wherein the performing the rough leveling of the high resolution scan comprises performing an approximate leveling of the high resolution scan.

3. The method of claim 2, wherein the generating the second sub-frame using interpolation of the first sub-frame comprises using a two dimensional interpolation.

4. The method of claim 3, wherein the using the two dimensional interpolation comprises using an interpolation technique selected from the group consisting of a cubic spline interpolation, linear interpolation, and combinations thereof.

5. The method of claim 2, wherein the performing the approximate leveling of the high resolution scan comprises using a first order line-by-line filter.

6. The method of claim 5, wherein the using the first order line-by-line filter comprises using a least squares fitting with a first order polynomial for each line in the high resolution scan.

7. The method of claim 2, further comprising:
   removing artifacts indicative of a thermal drift in the high resolution scan;
   wherein the aligning the portion of the low resolution scan and the high resolution scan using pattern recognition and the database of features comprises:
      performing a pattern recognition to locate a position of a feature in the high resolution scan;
      performing a pattern recognition to locate a position of a feature in the second sub-frame;
      determining an offset between the position of the feature in the high resolution scan and the position of the feature in the second sub-frame; and
      selecting a third sub-frame of the low resolution scan, wherein a center of the third sub-frame is adjusted during the selecting the third sub-frame to substantially eliminate the offset;
   wherein the subtracting the high resolution scan from the aligned portion of the low resolution scan comprises subtracting the high resolution scan from the third sub-frame to form an error dataset; and wherein the leveling the high resolution scan based on the result of the subtraction comprises performing a leveling of the high resolution scan using the error dataset.

8. The method of claim 7, wherein the feature is a writer pole.

9. The method of claim 7, wherein the removing the artifacts indicative of the thermal drift in the high resolution scan comprises:
    receiving an original image for correction, the original image having been generated using microscopy;
    receiving information indicative of a feature selected from within the original image by a user, the selected feature comprising an edge;
    storing the original image in a database comprising a plurality of images, each comprising one or more features;
    correlating the selected feature with one of the one or more features stored in the database to identify a first plurality of points defining the edge;
    removing one or more points of the first plurality of points using an outlier rejection technique;
    generating a smoothing spline approximation for a second plurality of points defining the edge; and
    generating a corrected image by shifting points of the original image in accordance with the smoothing spline approximation.

10. The method of claim 7, wherein the performing the pattern recognition to locate the position of the writer pole in the high resolution scan comprises using a normalized cross correlation matching to correlate the position of the feature in the high resolution scan and a position of a corresponding feature in a reference scan stored in the database of writer pole scans.

11. The method of claim 7, wherein the performing the leveling of the high resolution scan using the error dataset comprises:
    performing a line by line leveling of the high resolution scan; and
    performing a de-tilt plane leveling of the high resolution scan.

12. The method of claim 11, wherein the performing the line by line leveling of the high resolution scan comprises:
    performing a zero order line by line leveling on the error dataset; and
    subtracting values of the leveled error dataset from lines of the high resolution scan.

13. The method of claim 11, wherein the performing the de-tilt plane leveling of the high resolution scan comprises:
    performing a function on the error dataset, the function selected from the group consisting of a first order two dimensional plane fitting on the error dataset and a two dimensional smoothing spline approximation on the error dataset; and
    subtracting a result of the function from the high resolution scan.

14. The method of claim 7, wherein the method is performed on a general purpose computer using software configured to perform complex mathematical computations.

15. The method of claim 7, wherein the subtracting the high resolution scan from the third sub-frame to form an error dataset comprises substantially eliminating points relating to the feature in the high resolution scan and points relating to the feature in the second sub-frame.

16. The method of claim 1, wherein the method is performed on a general purpose computer using software configured to perform complex mathematical computations.

17. The method of claim 1, wherein the performing the low resolution pole tip recession scan comprises scanning the pole tip area with a substantially constant speed.

18. The method of claim 17, wherein the performing the high resolution writer pole recession scan comprises scanning the writer pole area with a second substantially constant speed.

19. The method of claim 1, wherein the performing the high resolution writer pole scan comprises scanning the writer pole area with a substantially constant speed.

* * * * *